United States Patent [19]
Klinkner et al.

[11] Patent Number: 5,826,337
[45] Date of Patent: Oct. 27, 1998

[54] METHOD OF SECURING BUSHINGS TO A CLOSING WHEEL ARM

[75] Inventors: Allen O. Klinkner, Lake Crystal; Larry R. Hancock, North Mankato, both of Minn.

[73] Assignee: May-Wes Manufacturing, Inc., Hutchinson, Minn.

[21] Appl. No.: 740,236

[22] Filed: Oct. 25, 1996

Related U.S. Application Data

[62] Division of Ser. No. 539,861, Oct. 6, 1995.

[51] Int. Cl.$^6$ ..................................................... B23P 6/00
[52] U.S. Cl. ........................... 29/891; 29/402.16; 29/464; 228/44.3; 228/119; 228/212
[58] Field of Search .................................. 228/44.3, 119, 228/212; 29/891, 402.16, 464, 559

[56] References Cited

U.S. PATENT DOCUMENTS

| | | | |
|---|---|---|---|
| 568,043 | 9/1896 | Reinhart | 228/44.3 |
| 2,226,496 | 12/1940 | Jacocks | 228/212 |
| 2,387,154 | 10/1945 | Kalwitz | 228/212 |
| 3,122,111 | 2/1964 | Taylor, Sr. | 111/190 |
| 3,124,202 | 3/1964 | Van Dyk | 111/195 |
| 3,561,094 | 2/1971 | Harris | 29/402.16 |
| 3,981,061 | 9/1976 | Jackson et al. | 29/464 |
| 4,212,098 | 7/1980 | Sand | 29/464 |
| 4,628,575 | 12/1986 | Klufas et al. | 29/464 |
| 5,562,055 | 10/1996 | Petersen | 111/195 |

FOREIGN PATENT DOCUMENTS

| | | | |
|---|---|---|---|
| 2810221 | 7/1979 | Germany | 111/194 |
| 942622 | 11/1963 | United Kingdom | 29/464 |

*Primary Examiner*—David P. Bryant
*Attorney, Agent, or Firm*—Burd, Bartz & Gutenkauf

[57] ABSTRACT

The disclosed invention is an improved closing wheel attachment mechanism which has longer wear life than that of the typical attachment mechanism. The closing wheel arm on an agricultural planter has installed thereon an improved grease bushing assembly which has increased wear surface and the capability to utilize a grease on the surface. The combination of increased wear surface and greasing will greatly increase the operational life of the planter. Also included in the invention is the process and fixturing to incorporate the improved configuration on to an existing planter closing wheel structure. Included in this attachment mechanism is a welding jig which assures proper alignment of the improved bushing assembly.

23 Claims, 2 Drawing Sheets

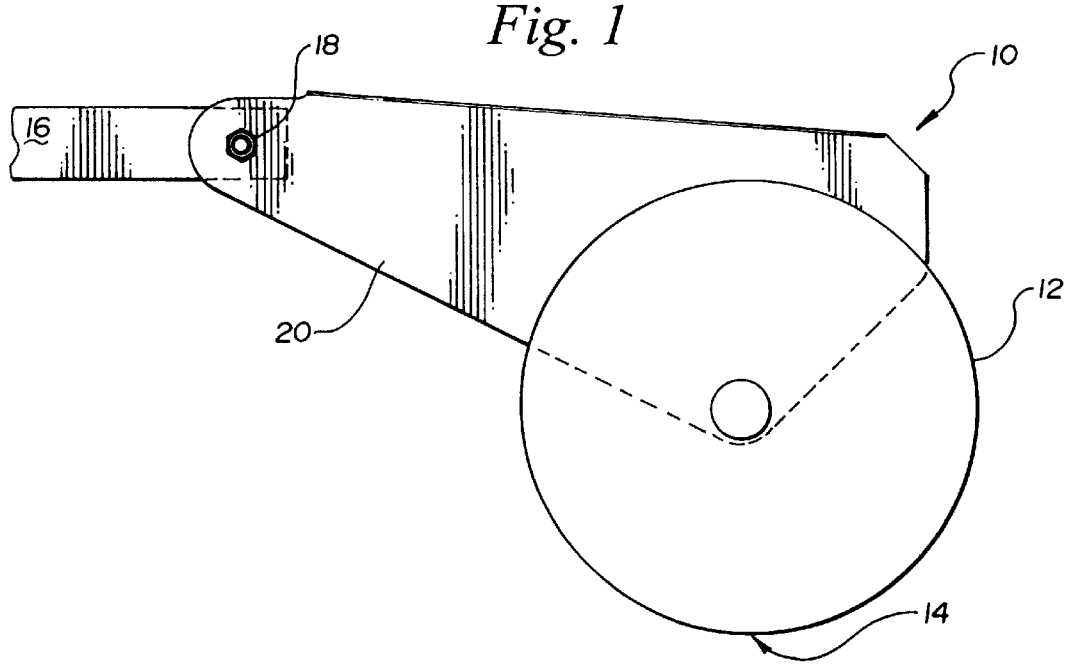
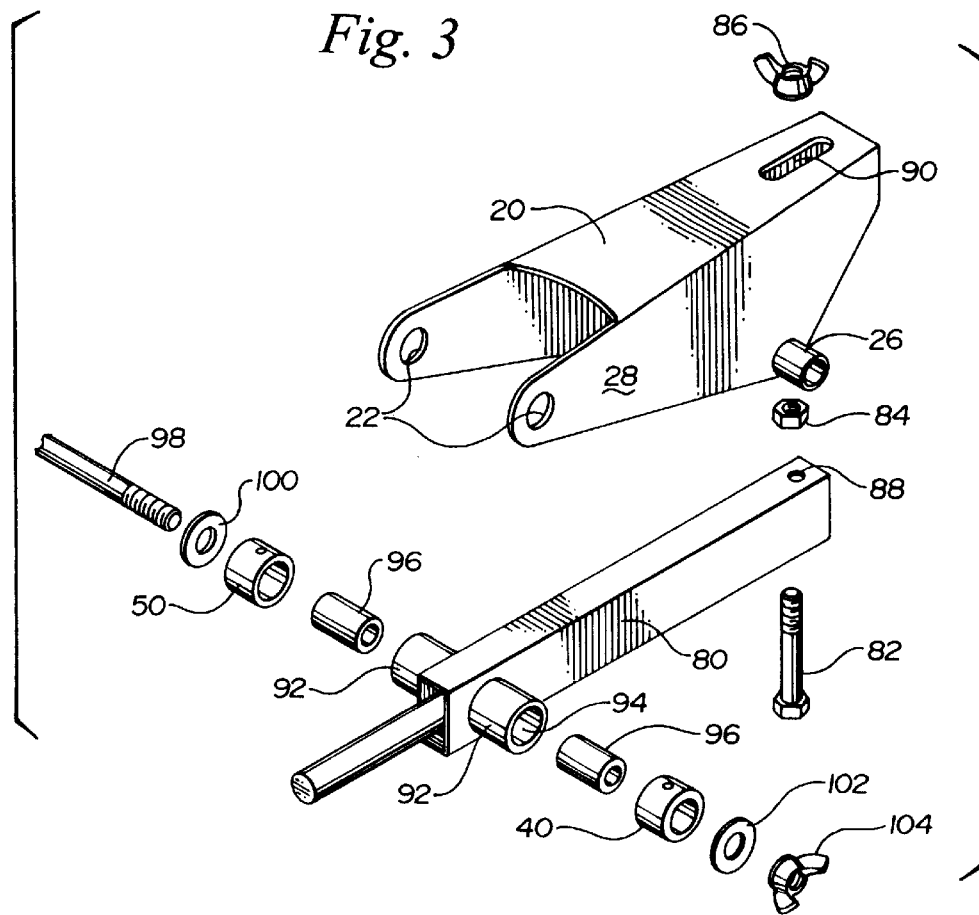

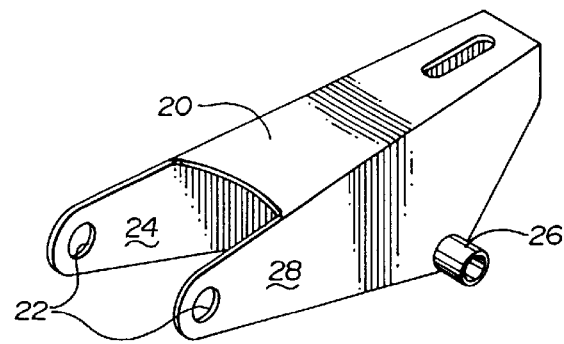
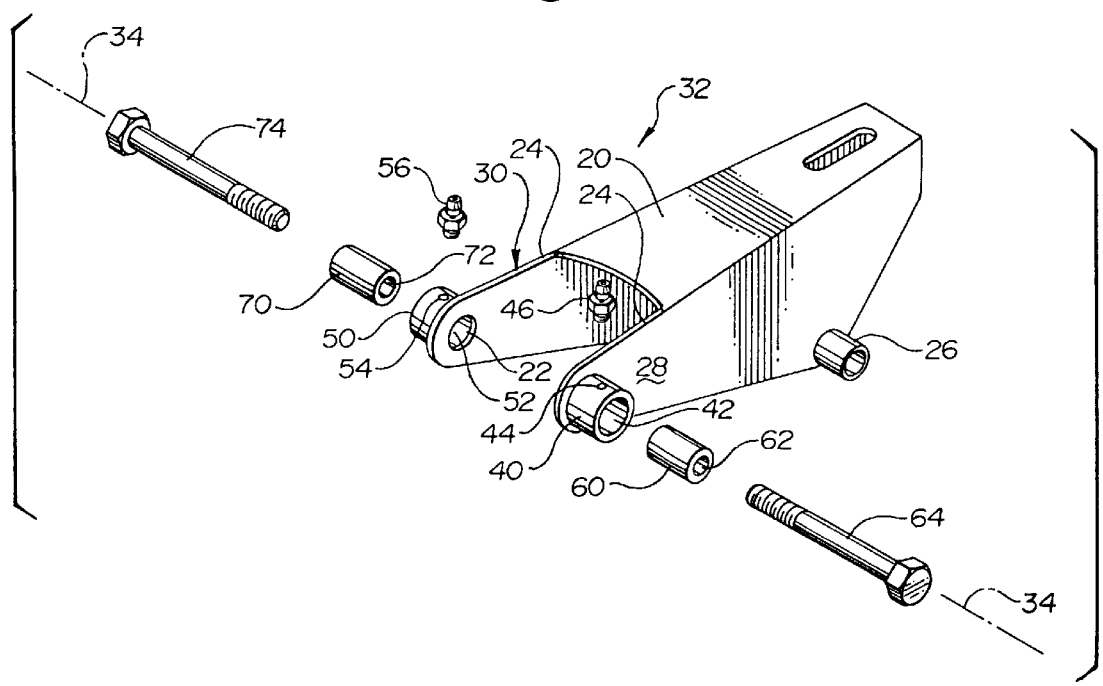

METHOD OF SECURING BUSHINGS TO A CLOSING WHEEL ARM

This is a Divisional of co-pending application Ser. No. 08/539,861, filed on Oct. 6, 1995.

BACKGROUND OF THE INVENTION

The present invention relates to an improvement in farm machinery which greatly increases its life. More specifically, the present invention provides an improved mechanism for attaching a closing wheel assembly to the remainder of a planter.

In modern day farm operations, spring planting is accomplished through use of a planter which deposits seeds in the ground in an orderly fashion so as to allow for controlled growing and harvesting of crops. One type of planter utilizes a mechanism known as a closing wheel assembly. The purpose of this closing wheel assembly is to compact the soil around the seed after it has been deposited in the ground so as to promote germination of the seed. As will be appreciated by those skilled in the art, the operation of this closing wheel assembly can drastically affect the manner in which crops grow each year. Improper operation has the potential to defeat the purpose of the closing wheel assembly altogether. In turn, this can directly affect crop production and yield.

Referring to FIG. 1, there is shown the side view of a typical closing wheel assembly 10. Closing wheel assembly 10 consists of a pair of closing wheels 12 attached to a closing wheel arm 20. Closing wheels 12 are attached on either side of closing wheel arm 20 and are typically aligned at an angle which causes the two wheels to meet at a bottom edge 14. Closing wheel arm 20 is then attached to the planter by a planter arm 16. Typically connection between closing wheel arm 20 and planter arm 16 is accomplished by a pair of attachment bolts 18 on either side of closing wheel arm 20.

The configuration of closing wheel assembly 10 allows the entire assembly to rotate about the axis of attachment bolts 18. This rotation allows bottom edge 14 of closing wheels 12 to travel up and down as the planter traverses the ground. As can be expected, this up and down motion (and likely some further jarring forces) causes wear at the connection joint between planter arm 16 and closing wheel arm 20.

Referring to FIG. 2 there is shown a perspective view of closing wheel arm 20 shown alone. Closing wheel arm 20 includes a pair of apertures 22 existing in a pair of parallel mounting or attachment structures 24. Also shown in FIG. 2 is an attachment structure 26 to which a closing wheel 12 is attached. The alignment of apertures 22 and an aperture in planter arm 16 (not shown) along with attachment bolts 18 is very critical to the proper alignment of the closing wheel assembly 10. The alignment of each of these apertures and their relationships to one another will affect the tracking characteristics of bottom edge 14 of closing wheels 12. As misalignment can be detrimental to the growth of seeds, such misalignment must be avoided.

As previously mentioned, the motion or movement of closing wheel assembly 10 in relation to the planter causes wear on and structural degradation in closing wheel arm 20. Specifically, wear is caused in attachment apertures 22 causing them to be enlarged. Typically the inner surface of apertures 22 is relatively small (approximately ⅛ to ¹⁄₁₆ inch). Thus, wear is inevitable. Once this occurs, a good deal of "play" is created in the closing wheel assembly causing it to track incorrectly.

At this point, the operator has a number of alternatives in order to correct this problem. A first alternative is to replace closing wheel arm 20 entirely. While this solution will suffice to make the planter operational once again, it is not an optimum solution as closing wheel arm 20 will simply wear out in some period of time. Furthermore, the replacement of closing wheel arm 20 with a new part creates a cumbersome and involved repair process which must be undertaken by the owner. This process is undesirable as it requires removal of all parts (including closing wheels 12) and reattachment to a new closing wheel arm 20.

Another alternative is to fill in the wear created in closing wheel arm 20. Again, this is a very involved and somewhat futile process as closing wheel arm 20 is likely to wear out once again within a short period of time. Other ineffective alternatives include the use of a washer or filler part which is adjusted to pick up slack in attachment aperture 22. This solution is also ineffective due to the need for constant readjustment as the planter is used.

Consequently, a need exists for a solution which will avoid the wear which takes place in attachment apertures 22 altogether.

SUMMARY OF THE INVENTION

The present invention provides an improved attachment assembly for a planter closing wheel arm which will substantially eliminate wear. The present invention provides a solution which will fix any problems wear has already created and also will create an improvement in the closing wheel arm 20 which will essentially eliminate any future wear. Furthermore, the present invention is extremely adaptable to a number of different configurations of the closing wheel arm 20 and very easy to install.

The present invention provides a grease bushing assembly which is attached to the closing wheel arm. This bushing assembly greatly increases the wear surface utilized by the closing wheel arm. Furthermore, the invention creates the opportunity to grease the wear surfaces thus greatly increasing their life.

When installed, the resulting product consists of a pair of outer bushings attached to the closing wheel arm. This attachment is typically done by welding. Situated within an aperture in the outer bushings is an inner bushing. This inner bushing is bolted to the planter so as to be rigidly affixed thereto. Motion of the closing wheel arm relative to the planter takes the form of rotation around the bushing configuration.

In order to achieve the improved bushing configuration contemplated by the present invention, a welding jig is provided to easily accommodate the improvement process. In the performance of the repair, the welding jig is attached to the closing wheel arm which will hold a pair of bushings in close contact with the closing wheel arm. Furthermore, the apertures in the outer bushings are held in a position so as to be coaxially aligned with one another and with the apertures contained in the closing wheel arm. This holding and alignment is essential to the proper installation of the necessary bushings. Furthermore, by the use of this welding jig, the easy attachment or welding of bushings to the closing wheel arm is accomplished.

It is therefore an object of the present invention to provide an improved configuration for the attachment of the closing wheel assembly to the planter. Further, it is an object to provide a repair kit which will repair and improve the aforementioned connection. This repair and improvement provides a rotational attachment mechanism which is low wearing and has long life.

It is a further object of the present invention to provide a process and tools necessary for easy repair of a planter by its owners. This easy repair is accomplished by providing proper alignment and holding tools so as to simplify any welding or connections required.

BRIEF DESCRIPTION OF THE DRAWINGS

Further objects and advantages of the present invention can be seen by reading the following detailed description in conjunction with the drawings in which:

FIG. 1 is a side view of the closing wheel assembly of the prior art;

FIG. 2 is a perspective view of the closing wheel arm of the prior art;

FIG. 3 is an exploded view of the parts making up the closing wheel arm repair kit; and FIG. 4 is an exploded view of an improved closing wheel arm and its cooperating parts.

DETAILED DESCRIPTION OF THE INVENTION

Referring now to FIGS. 3 and 4, there is shown exploded views of both of a welding jig 80 and associated parts used to incorporate the improvement (FIG. 3) and the final product (FIG. 4). Referring first to FIG. 4, there is shown the improved closing wheel arm attachment mechanism 32. Closing wheel arm 20 is shown without closing wheels 12 attached. It is understood by those skilled in the art that it is not necessary to remove closing wheels 12 during the repair or improvement process. However, these wheels are not shown for simplicity in describing the structure of the invention.

Attached to closing wheel arm 20 are a first outer bushing 40 and a second outer bushing 50. First outer bushing 40 and second outer bushing 50 are attached to a first attachment surface 28 and a second attachment surface 30, respectively. It will be noted that first attachment surface 28 and second attachment surface 30 are integral portions of closing wheel arm 20 and are the outer surfaces of attachment structure 24. The two attachment surfaces 28 and 30 are configured to be substantially parallel to one another. The attachment structure 24 extends from closing wheel assembly 20 in an ear-type configuration whereby these ears extend from and are clear from other portions of closing wheel arm 20. As previously stated with reference to FIG. 2, attachment structure 24 (and thus first attachment surface 28 and second attachment surface 30) contain attachment apertures 22 therein.

Both first outer bushing 40 and second outer bushing 50 are substantially cylindrical in configuration, each having a cylindrical aperture therein (first outer bushing aperture 42 and second outer bushing aperture 52, respectively). These bushings (40 and 50) are attached to closing wheel arm 20 such that the outer bushing apertures 42 and 52 are coaxially aligned with attachment apertures 22. Consequently, first outer bushing aperture 42, second outer bushing aperture 52 and attachment apertures 22 of closing wheel arm 20 are all aligned along a single alignment axis 34. This alignment allows for proper rotation and movement of closing wheel arm 20 as necessary during operation of the aforementioned planter.

First outer bushing 40 has a second aperture or grease aperture 44 included therein. Grease aperture 44 exists in the cylindrical wall of first outer bushing 40 and is configured such that the axis of the aperture is perpendicular to the aforementioned alignment axis 34. Placed within first bushing grease aperture 44 is a first grease fitting 46. This grease fitting is a well-known part which allows for the insertion of grease into bushing aperture 42 when assembled.

Similar to first outer bushing 40, second outer bushing 50 also has a grease aperture 54 therein. Again, this aperture is configured to be perpendicular to alignment axis 34. Fitted within aperture 54 is a second grease fitting 56.

Also shown in FIG. 4 are a first inner bushing 60 and a second inner bushing 70. Each of these bushings are also substantially cylindrical and further have a cylindrical aperture 62 and 72, respectively, therein. These bushings are configured to be inserted into first bushing aperture 42 and second bushing aperture 52. The dimensions are configured such that these bushing sets (e.g. first inner bushing 60 and first outer bushing 40, or, second inner bushing 70 and second outer bushing 50) fit in tight cooperation with one another. Following the insertion of first inner bushing 60 into first outer bushing aperture 42, a first attachment bolt 64 is inserted into first inner bushing aperture 62. This bolt is configured to extend through the inner bushing and attached to the frame or planter arm 16 (not shown) of the planter. Once so attached, first attachment bolt 64 and first inner bushing 60 are rigidly attached to planter arm 16. Similarly, a second attachment bolt 74 is inserted through second inner bushing aperture 72 and is also attached to a second side of planter arm 16 (again not shown). This attachment causes second inner bushing 70 and second attachment bolt 74 to be rigidly attached to planter arm 16.

In operation, inner bushings 60 and 70 are rigidly attached to the planter. However, they are placed in tight cooperation with outer bushings 40 and 50. This cooperation allows for rotational motion of closing wheel arm 20 about the alignment axis 34. As previously mentioned, first outer bushing 40 and second outer bushing 50 each contain grease fittings (46 and 56) so as to allow the insertion of grease into the outer bushing apertures (42 and 52). This insertion of grease causes the inner surface of apertures 42 and 52 to be coated with grease along with the outer surfaces of both first inner bushing 60 and second inner bushing 70. Thus, there is created a lubricated bushing assembly with a large wear surface. This combination (large surface area and lubrication) creates for a long wearing bushing assembly which will be resistant to structural degradation.

It will be recognized and understood that certain modifications may be necessary to adapt the improved attachment mechanism to different planters. For example, attachment apertures 22 may be smaller than first and second outer bushing apertures 42 and 52, thus requiring first inner bushing 50 and second inner bushing 70 to be modified. In this situation, first inner bushing 60 may have a portion thereof reduced in diameter such that the reduced portion will fit into attachment aperture 22, while the remaining portion will work in tight cooperation with the inner surface of first bushing aperture 42. Similar alterations will also be made to second inner bushing 70.

Referring back to FIG. 3, there is shown an exploded view of the repair system parts used to install the improved lubricated attachment mechanism. Welding jig 80 is utilized to properly align all of the parts during the installation of the improved bushing system. Initially welding jig 80 is attached to closing wheel arm 20 by use of an attachment bolt 82, a first nut 84 and an attachment wing nut 86. Attachment bolt 82 is inserted through a connection aperture 88 in welding jig 80 and attached thereto by first nut 84. An extending portion of first attachment bolt 82 is extended through an aperture 90 in closing wheel arm 20. Attachment wing nut 86 can then be used to secure closing wheel arm 20 to welding jig 80.

Welding jig 80 is utilized to properly align and position first outer bushing 40 and second outer bushing 50 so they can be easily attached to closing wheel arm 20. This attachment is typically done via welding the parts together. However, other attachment methods could be used. To accomplish this alignment, welding jig 80 includes an alignment structure 92 consisting of a structure containing two alignment apertures 94 axially aligned on either side of welding jig 80. Welding jig 80 is configured such that the alignment apertures 94 are coaxially aligned with closing wheel arm attachment apertures 22 when welding jig 80 is attached to closing wheel arm 20.

Following the attachment of welding jig 80 to closing wheel arm 20, a pair of alignment bushings 96 are inserted through attachment apertures 22 and into alignment apertures 94. Alignment bushings 96 are configured such that they will be seated in alignment aperture 94 and will extend beyond attachment surfaces 28 and 30 of closing wheel arm 20. Due to this configuration, first outer bushing 40 and second outer bushing 50 can thus be positioned around alignment bushings 96. Again, alignment bushings 96 are of a proper size such that they can be inserted into first bushing aperture 42 and second bushing aperture 52.

When properly positioned, first outer bushing 40 and second outer bushing 50 are positioned adjacent to first attachment surface 28 and second attachment surface 30 of closing wheel arm 20. All of these parts are then held in place by a holding bolt 98, a pair of washers 100 and 102, and a holding wing nut 104. Washers 100 and 102 are of a sufficient size to cover the edges of first outer bushing 40 and second outer bushing 50. Through the use of holding bolt 98 and holding wing nut 104, all of these parts are then sandwiched together and held in place so as to facilitate the attachment of first outer bushing 40 and second outer bushing 50 to the closing wheel arm 20. Due to the use of a single holding bolt 98, alignment bushings 96 and welding jig 80, first outer bushing 40 and second outer bushing 50 are axially aligned with the attachment apertures 22 in closing wheel arm 20. This alignment will assure proper operation of the closing wheel arm assembly and when used in a planter.

Again, it will be understood that modifications may be necessary to adapt to different closing wheel arm assemblies. As an example, alignment structure apertures 94 may have a smaller diameter and alignment bushings 96 may have a portion thereof with a reduced diameter. This reduced diameter again may be necessary to accommodate a reduced size of attachment apertures 22.

Having described the present invention in considerable detail, it is understood that certain modifications can be made to the specific detail described. We claim all modifications coming within the scope and spirit of the following claims.

It is claimed:

1. A method for improving an attachment mechanism which connects a closing wheel arm having an attachment surface containing an aperture to the main structure of a planter, comprising the steps of:

attaching a welding jig having an alignment mechanism to the closing wheel arm;

placing the alignment mechanism adjacent the aperture in the closing wheel arm with a portion thereof extended through the aperture;

placing an outer bushing over the portion of the alignment mechanism extended through the aperture;

holding the outer bushing against the attachment surface of the closing wheel arm in alignment with the aperture and alignment mechanism;

welding the outer bushing to the attachment surface of the closing wheel arm; and attaching a grease fitting to the outer bushing for allowing grease to be inserted into an aperture in the outer bushing.

2. The method of claim 1 wherein the step of holding is accomplished by placing a bolt through the alignment mechanism and aperture so as to hold the outer bushing in place.

3. The method of claim 1 wherein the closing wheel arm has a second attachment surface containing a second aperture further comprising:

holding a second outer bushing in contact with the second attachment surface of the closing wheel arm; welding the second outer bushing to the second attachment surface; and attaching a second grease fitting to the second outer bushing for allowing the insertion of grease into an aperture within the second outer bushing.

4. The method of claim 1 wherein the jig is releasably attached to the closing wheel arm with a nut and a bolt assembly.

5. A method for improving an attachment mechanism which connects a wheel arm having an attachment surface containing an aperture to a frame, comprising:

attaching a jig having an alignment mechanism to the wheel arm;

placing the alignment mechanism adjacent the aperture in the attachment surface with a portion of the alignment mechanism extended through the aperture;

locating a bushing on the portion of the alignment mechanism extended through the aperture;

holding the bushing in engagement with the attachment surface; and securing the bushing to the attachment surface.

6. The method of claim 5 wherein the holding of the bushing is accomplished with a nut and bolt assembly extended through the bushing and the portion of the alignment mechanism extended through the aperture.

7. The method of claim 5 including attaching a grease fitting to the bushing for allowing the insertion of grease into an aperture within the bushing.

8. The method of claim 5 wherein the bushing is secured to the attachment surface by welding the bushing to the surface.

9. The method of claim 5, wherein the jig is releaseably attached to the wheel arm with a nut and bolt assembly.

10. A method for improving an attachment mechanism which connects a closing wheel arm having first and second attachment surfaces located generally parallel to each other, said attachment surfaces having axially aligned apertures to a frame of a planter, comprising:

attaching a jig having alignment mechanisms to the closing wheel arm;

placing the alignment mechanisms adjacent to the apertures in the first and second attachments surfaces;

extending portions of the alignment mechanisms through the apertures in the first and second attachment surfaces;

placing a first bushing on one portion of the alignment mechanisms extended through one aperture;

placing a second bushing on another portion of the alignment mechanisms extended through the other aperture;

holding the first bushing in engagement with the first attachment surface and the second bushing in engagement with the second attachment surface such that the first and second bushing are in alignment with the apertures in the first and second attachment surfaces; and securing the first bushing to the first attachment surface and the second bushing to the second attachment surface.

11. The method of claim 10 wherein: the jig is releasably attached to the closing wheel arm with a nut and bolt assembly.

12. The method of claim 10 including holding the first and second alignment mechanisms in engagement with the closing wheel arm during the holding of the first and second bushing in engagement with the first and second attachment surfaces.

13. The method of claim 12 wherein the holding of the first and second bushings is accomplished with a single means extended through the alignment mechanisms and first and second bushings to clamp the first and second bushings against the first and second attachment surfaces.

14. The method of claim 13 wherein the single means is a releasable nut and bolt assembly extended through the alignment mechanisms and first and second bushings.

15. The method of claim 10 including attaching grease fittings to the first and second bushings for allowing the insertion of grease into apertures within the bushings.

16. The method of claim 10 wherein: the first and second bushings are secured to the first and second attachment surfaces by welding the bushings to the surfaces.

17. A method for improving an attachment mechanism which connects an arm to a frame, the arm having first and second attachment surfaces located generally parallel to each other, said attachment surfaces having axially aligned apertures, comprising:

attaching a jig having alignment mechanisms to the arm;

placing the alignment mechanisms adjacent to the apertures in the first and second attachments surfaces;

extending portions of the alignment mechanisms through the apertures in the first and second attachment surfaces;

placing a first member on one portion of the alignment mechanisms extended through one aperture;

placing a second member on another portion of the alignment mechanisms extended through the other aperture;

holding the first member in engagement with the first attachment surface and the second member in engagement with the second attachment surface such that the first and second members are in axial alignment with the apertures in the first and second attachment surfaces; and securing the first member to the first attachment surface and the second member to the second attachment surface.

18. The method of claim 17 wherein the jig is releasably attached to the arm with a nut and bolt assembly.

19. The method of claim 17 including holding the first and second alignment mechanisms in engagement with the arm during the holding of the first and second members in engagement with the first and second attachment surfaces.

20. The method of claim 19 wherein the holding of the first and second members is accomplished with a single means extended through the alignment mechanisms and first and second members to clamp the first and second members against the first and second attachment surfaces.

21. The method of claim 20 wherein: the single means is a nut and bolt assembly extended through the alignment mechanisms and first and second members.

22. The method of claim 17 including attaching grease fittings to the first and second members for allowing the insertion of grease into apertures within the members.

23. The method of claim 17 wherein: the first and second members are secured to the first and second attachment surfaces by welding the members to the surfaces.

* * * * *